United States Patent [19]

Davis et al.

[11] Patent Number: 5,416,495
[45] Date of Patent: May 16, 1995

[54] LIQUID-CRYSTAL DISPLAY UNIT FOR ELECTRONIC DIRECTORY

[75] Inventors: William R. Davis, La Canada; John F. Ahlstrom, Chatsworth; Richard P. Greenthal, Los Angeles, all of Calif.

[73] Assignee: Sentex Systems, Inc., Chatsworth, Calif.

[21] Appl. No.: 985,017

[22] Filed: Dec. 4, 1992

Related U.S. Application Data

[63] Continuation-in-part of Ser. No. 705,346, May 24, 1991, Pat. No. 5,252,955, which is a continuation of Ser. No. 215,992, Jul. 7, 1988, Pat. No. 5,027,111.

[51] Int. Cl.⁶ .............................................. G09G 3/36
[52] U.S. Cl. ................................................... 345/87
[58] Field of Search ...................... 345/1, 2, 87, 101; 359/601, 609, 611–614; 361/679, 681, 687, 688, 724; 348/842

[56] References Cited

U.S. PATENT DOCUMENTS

| | | | |
|---|---|---|---|
| 2,075,065 | 3/1937 | Ish-Shalom et al. | 359/609 |
| 2,131,875 | 10/1938 | Hopfield | 359/609 |
| 3,484,748 | 12/1969 | Greenblum et al. | 345/2 |
| 4,720,849 | 1/1988 | Tayama | 345/1 |
| 5,027,111 | 6/1991 | Davis et al. | 345/101 |
| 5,121,253 | 6/1992 | Waintroob | 359/609 |
| 5,218,474 | 6/1993 | Kirschner | 359/609 |
| 5,233,468 | 8/1993 | McNulty | 359/614 |
| 5,243,463 | 9/1993 | Waintroob | 359/609 |
| 5,252,955 | 10/1993 | Davis et al. | 345/87 |

Primary Examiner—Jeffery Brier
Attorney, Agent, or Firm—Ashen & Lippman

[57] ABSTRACT

A liquid-crystal display preferably eighteen lines of forty characters each, is mounted in a case. The temperature of the display medium is held within operating limits for the display—notwithstanding ambient temperature and humidity variations over generally normal ranges for at least the temperate zones, and even if the display unit receives direct sunlight. The unit works outdoors, at temperatures to at least 46° C. (115° F.) as well as in buildings with no temperature control. This is accomplished by use of a shading hood, and a window (preferably unperforated polycarbonate, curved, upward-and-outward-concave, and cylindrical-segment) that reflects to a viewer only light from the hood underside. No ventilating fan, plenum or other ventilating opening is needed. A circuit-board-mounted temperature sensor controls the contrast-adjusting voltage of the display—using data in a digital-memory "look up" table. A heater is preferably provided, also temperature-controlled. The entire unit can be flush-mounted in a wall without disrupting operation. Visible glare arising in reflection at the window is reduced by the hood-and-window combination, without need for any antireflection coating on the window.

30 Claims, 6 Drawing Sheets

LIQUID-CRYSTAL DISPLAY UNIT FOR ELECTRONIC DIRECTORY

RELATED APPLICATIONS AND PRIORITY

This is a Continuation-in-Part of U.S. patent application Ser. No. 705,346, filed May 24, 1991, and issued on Oct. 12, 1993, as U.S. Pat. No. 5,252,955; which was in turn a Continuation of U.S. patent application Ser. No. 215,992, filed Jul. 7, 1988, and issued Jun. 25, 1991, as U.S. Pat. No. 5,027,111.

BACKGROUND

1. FIELD OF THE INVENTION

This invention relates generally to practical display units for electronic directories and like electronic tabulations for public viewing; and more particularly to a display unit for an electronically controlled directory that employs a liquid-crystal display.

2. PRIOR ART

Directories are commonly posted in the public lobbies of business buildings, apartment houses, multiple-building condominimum complexes, and other multiple-occupant facilities. In secured facilities, the entries in such directories often include room or suite numbers, or other numbers for use with an adjacent telephone or intercom in contacting individual occupants to gain admission.

In a few large facilities, in recent years, hand-lettered or movable-letter directories have given way to electronic systems that are much easier to revise. Such systems eliminate tedious manual reshuffling of placards or letters to keep entries in alphabetical order and to accommodate subdivision or consolidation of occupant suites.

Although they are an enormous improvement over manual directories, the electronic systems have suffered from a major limitation in their use of cathode-ray-tube (CRT) display units. Such video display units, in the forms currently encountered in commercial practice, have several well-known drawbacks.

The drawbacks of CRT displays include image instability, poor resolution and (particularly in bright light) poor contrast. Instability of the image, ranging from minor flicker to vertical roll, can make reading the information on the screen difficult.

Poor resolution severely limits the number of entries that can be displayed simultaneously on a screen of moderate size. This strategy sometimes leads to very large screens that visually dominate a lobby.

Some system designers attempt to avoid this drawback by programming the units in operating modes that call upon a visitor to "page through" different screens to find a particular occupant. The "page through" mode itself is in principle entirely acceptable, but when the number of entries on a screen is unduly small—so that a typical visitor must search through several screens even for a relatively small directory—the typical visitor justifiably becomes annoyed. That is what happens with a CRT display, because of its limitations.

Alternative methods for locating an occupant without paging are either more complicated or more expensive, or both. For example, some systems provide a large alphanumeric keypad and require the user to spell the first few letters of the occupant's name. This increases the system cost and also reduces convenience, particularly for a user who is unsure how to spell the name.

In general all these drawbacks also detract from efforts by facility management to establish an elegant or prestigious style in a lobby or outdoor entry area. Poor contrast is considered among the worst offenders in this regard.

Sometimes, in the interest of offsetting poor contrast, directory system designers introduce the use of colors in the video display. Often, however, this strategy is counterproductive, because the CRT or video colors inject an incongruously gaudy element into a fine decor.

CRT displays are particularly troublesome in brightly lit environments such as outdoors and in lobbies surrounded by large windows that admit brilliant sunlight. In these circumstances, contrast can be so inadequate that the displays are almost completely unreadable.

Moreover, CRT displays are relatively expensive. In large formats they are too deep (front to back) for straightforward mounting in a wall—and so require provision of a free-standing or recessed support structure enclosure two or three feet deep. Because of their evacuated-chamber construction, they are also relatively fragile and inordinately subject to vandalism.

Other display types—light-emitting diode (LED) and liquid-crystal displays (LCD)—are known for use with electronic information processors. Before introduction of our directories disclosed in the above-mentioned parent applications, LCD displays were not effective or in common use for directories or other large electronic tabulations for public viewing; we shall explain some reasons for this shortly.

Most LEDs require relatively bulky apparatus for each character to be displayed. Furthermore LEDs are quite dim, and in the few very-small-screen outdoor applications where they have been used (such as some automatic-teller machines) they are extremely hard to read—even when elaborately shaded. A larger LED array such as required for a directory would be prohibitively difficult to shade effectively and would be inordinately expensive.

Under ideal conditions, liquid-crystal displays are capable of excellent contrast and resolution, are plainly readable even in the brightest light, and are readily backlighted for nighttime use. Their use also results in a far less expensive and much more compact product package. LCDs are accordingly excellent for directories and the like, and the LCD directories disclosed in the above-mentioned parent applications have been very successful; but LCDs do have important limitations.

An LCD has a display medium—the liquid-crystal fluid itself—and a structure which contains the fluid. In at least some commercial LCDs this structure typically includes two planar pieces of material with the medium sandwiched between them. At least the piece on the viewing side of the sandwich, which in this document we will call the LCD "face," ordinarily is transparent glass or plastic.

Electrodes are formed on the opposed interior surfaces of this sandwich. These electrodes too are ordinarily transparent on at least the face side. One electrode material is intrinsic tin oxide.

Both the fluid and the glass are very sensitive to temperature. (It may be recalled that the early applications of liquid-crystal displays were as novelty items, particularly including thermometers.)

If the temperature of the glass rises beyond certain relatively narrow limits, the display develops dark spots, or the entire display may actually turn dark. As we understand it, this darkening is due to an expansion of the cell gap within the glass. The black characters or other symbols then fail to stand out well against the darkening background.

On the other hand, if the temperature falls too much, the changing of characters begins to be very slow, an effect which is said to be related to increasing viscosity of the medium. As temperature decreases further the display blushes a different color (e.g., pink)—this time due to contraction of the cell gap—and again becomes unreadable.

Directory applications would call for use of the larger graphic LCDs, and also for a type of medium known as "super-twist" fluid. This kind of fluid provides far superior contrast and hence significantly better readability. The large LCDs, however, and especially those using supertwist fluid, are particularly sensitive to temperature.

Presumably for these reasons LCDs heretofore have been used primarily in applications involving small formats or intrinsic temperature control, or both. Thus LCDs are employed extensively for wristwatches— since they can make good use of LCDs that are smaller and nonsupertwist, and therefore less temperature-sensitive. LCD wristwatches also take advantage of the wearer's limited temperature tolerance, and heat conduction to and from the wearer's body, to limit the severity of temperatures to which the display is exposed.

Even under such relatively protected conditions, fading and blushing of wristwatch displays is well known to athletes and workers whose activities reach the anticipated design limits of the watches.

LCDs are also used for many usually indoor applications such as calculators and laptop computers. Here too they are typically used in temperature-controlled environments, or if they are found to malfunction can generally be moved into such environments.

Operation of large LCDs is subject to temperature problems in lobbies and other indoor entryways, as well as outdoors, if the locations receive intense sunlight. Temperature rise in such areas sometimes outstrips the capabilities of a building air-conditioning system, and can be severe enough to degrade the performance of an LCD.

If the LCD is inside a case, and protected from vandals by an unbreakable window, as is desirable in our application, the temperature problem can be aggravated much further. This is due to a "greenhouse" effect, in which air trapped between the window and the LCD becomes extremely hot, much like the interior of a car left shut on a hot day.

A related problem of LCD temperature sensitivity involves a voltage that is applied to the display medium to control the contrast of the characters relative to the background screen. The necessary voltage for proper contrast varies very strongly and nonlinearly with temperature.

Thus, as the temperature to which the LCD is exposed changes (e.g., between day and night), the LCD contrast requires constant adjustment to prevent characters from disappearing or otherwise becoming illegible. A very nonlinear relationship between the voltage and the temperature renders the problem of automatic contrast-control technique far from straightforward.

For whatever reason, LCDs were not used in sizable directory-type displays before introduction of our own earlier units made in accordance with the parent patent applications mentioned above. Those units in fact dealt very effectively with all the problems described above, and those described in the following paragraphs of this section as well; and were accorded a most favorable commercial reception.

They have, however, left some room for further refinement in that they require cooling fans and power to drive the fans. Our earlier units also require relatively expensive case construction to provide effective ventilation fans, plena and holes while deterring vandalism and theft.

The use of ventilation fans also draws dirt into the case with the ventilating air. Flow of dirty air through the unit produces an objectionable accumulation of dirt on the inside surface of the window and on the LCD face, a particular annoyance near construction sites.

Moreover, because of significant temperature gradients within the case, in our earlier units, we found it necessary to position in the LCD-face region—just inside the window—the temperature sensor needed to develop a temperature-compensating voltage for contrast control. This required relatively costly and awkward cabling to the sensor from the circuit board at the rear of the display-unit case.

We will return now to more general discussion of electronic directories and the like.

Another problem arises in configuration of such devices when outdoor or bright-lobby applications are involved. That is the problem of controlling reflections at glass or plastic surfaces of the display unit.

Such reflections of the viewing person—and of objects around and behind that person, become confused with the displayed characters, making the display very hard to read. When sufficiently bright, these reflections actually obscure the displayed characters.

As a verbal shorthand we shall refer to these confusing and obscuring reflections collectively as "glare." Such glare can be controlled to a certain extent by providing a matte finish on the screen itself, provided that the electronic display screen (such as a CRT screen) is directly exposed to the viewing person. Direct exposure of the display screen is accordingly a conventional teaching of the prior art.

This conventional teaching, however, severely limits the use of electronic directories since it makes them susceptible to vandalism. Direct exposure of the display screen makes it easy for a vandal to break the screen or damage the display unit.

Hence there is a conflict between the direct exposure desired to control glare, and the interposition of an intermediate protective window desired to control vandals. This conflict is present with CRTs and LEDs—but particularly acute with LCDs because of the very way they work.

CRTs and LEDs inherently generate their own illumination, but LCDs depend upon incident light (either reflected or transmitted) for their characters to be seen. Different portions of the fluid will either absorb or reflect incident light, and thus form visible characters, depending on whether or not the fluid is electrically excited.

This mechanism explains why LCD characters do not seem to fade in direct sunlight as do CRT and LED characters. Light that is reflected at a glass or plastic surface, however, is light not used to develop visible LCD characters—and, in fact, is light that creates reflections which compete with the already diminished LCD characters.

Thus, again, even if there had been a suggestion of LCD use in electronic directories, such a suggestion would have been particularly likely to meet with immediate rejection in view of the relatively adverse glare-related properties of LCDs.

Our own earlier units, made in accordance with our above-mentioned prior patent applications, resolved glare problems satisfactorily by use of coatings applied to the window as well as the face of the LCD display. Again, this solution to the glare problem was found entirely satisfactory except for the cost of the coatings.

Finally, even though the electronic directory systems currently available are far more convenient in terms of entering and deleting names than the movable-letter or placard directories, before introduction of our units they still required local procedures for entries or revisions—either at the system itself or through a computer close by. This arrangement was very inconvenient for buildings with off-site property management, especially when tenant turnover was high and frequent directory changes required.

All of the above limitations resulted in the relatively limited use of electronic directories before the advent of commercial units corresponding to our inventions. As can now be seen, the prior art failed to provide an adequate display system for directories and the like, particularly for use out of doors and in lobbies or other entryways subject to intense sunlight.

Other prior art, not heretofore recognized as related to the field of the invention, is in the field of automobile instrument panels. There the problem of glare from sunlight is less severe because the roof of an automobile usually shields the instrument panel from all but the most steeply inclined rays.

In addition, the problem of solar heat loading is much less severe because large-area LCDs are not ordinarily used. Furthermore, automotive instrument panels normally need not be designed for significant resistance to vandalism.

Thus the only significant and relevant problem ordinarily is that images of objects inside the vehicle—in particular portions of the driver's own image—are reflected into the driver's eyes. Such reflections of course obscure the instrument readings.

In the automotive context, this residual problem is corrected to some extent by using a curved, upward-and-outward-concave instrument-panel window, with a small overhang of the instrument panel that shades the window from steeply inclined rays of direct sunlight. If the driver's eyes are in a relatively narrow range of positions evidently contemplated by the system designers, such a window reflects the inside of the overhang, rather than the driver's own image, into the driver's eyes.

In practice, however, as used in automotive applications the curved window works only if the driver's eyes are in rather exactly the design position—as to both height and fore/aft distance—behind the steering wheel. If the driver sits too far forward or sits too tall, relative to design expectations, the driver's view of the instruments is confused by superimposed parts of the driver's own image, or light from the sky or objects behind the driver.

Viewers of directories are not subject to standing or sitting in such a constrained fashion. Accordingly the glare-elimination problem is substantially more severe in relation to directories.

SUMMARY OF THE DISCLOSURE

Our invention is a display unit for an electronic directory that is exposed to sunlight. Preferred embodiments of the display unit comprise a case, including a front wall, and a liquid-crystal display mounted within the case and comprising a face for displaying directory information in the form of a directory.

Preferred display units of our invention further include an aperture in the front wall for viewing the display face, and a hood mounted to the front wall of the case. The hood extends outward from the front wall, at the aperture, and is dimensioned to shade substantially the entire aperture from sunlight at least at midday.

Generally throughout this document including the appended claims we intend such phrases as "shade from sunlight", "reflect all sunlight", "receives no reflected sunlight" etc. to refer only to rays of sunlight received directly from the sun in primary straight-line paths. Further, by phrases such as "reflect all sunlight" and "reflected sunlight" we refer only to specular reflection of that directly received sunlight.

Of course sunlight approaches our apparatus not only directly but also by reflection from the ground and from nearby buildings, plants and people—and even from the sky. Furthermore the transmissive window of our apparatus, like every surface (even a mirror surface) scatters much light as well as reflecting specularly. Except where otherwise clear from the context: (1) from our references to sunlight we explicitly exclude light thus approaching indirectly; and (2) from our references to directions of reflection we explicitly exclude scattering. These points apply throughout this document; it would be cumbersome to repeat them at every turn.

In addition the display unit includes a window mounted to the case at the aperture to protect the liquid-crystal display.

Preferred embodiments further include solid-state digital electronic circuitry, electrically interconnected with the liquid-crystal display, for electronically storing directory information and for controlling the liquid-crystal display unit to automatically exhibit stored directory information. The exhibit is in the form of a directory having multiple listings in an alphabetical or like order or in classified groupings.

Besides the elements enumerated above, our invention has two other major aspects, either of which suffices to describe our invention in a broad or general form:

the window is shaped, disposed and oriented to reflect outward to a viewer substantially only light from the undersurface of the hood;

the window is substantially cylindrical, and the hood extends outward from the front wall beyond the center of curvature of the window.

By "cylindrical", "cylinder" etc. wherever consistent with context we mean a cylindrical segment, a segment of a cylinder, etc.

We regard these two properties of the window as mutually independent, in accordance with correspondingly independent claims appended hereto. As will become clear, however, these two aspects of the invention are amenable to being practiced together, and we do prefer to practice the invention with both.

The foregoing may be a description or definition of the present invention in its broadest or most general terms. Even in such general or broad forms, however, as can now be seen the invention resolves the previously outlined problems of the prior art.

In particular heat loading is substantially eliminated because the direct rays of the sun are entirely deterred from striking the window at least at midday when heat loading is of primary significance. At those times, the window directly receives substantially no sunlight to reflect.

At other times, direct sunlight can strike the window, but at those times sunlight is not as intense. Moreover, much of it is reflected outward from the window rather than being admitted to the case.

We have tested units in accordance with our invention in desert temperatures up to 46° C. (115° F.), and with no ventilation fans or even ventilation holes. Remarkably, in these tests there was no blush of the LCD display.

In addition we have found that with this system the temperature distribution within the case is more homogenous, to such an extent that we can reposition—onto the circuit board at the rear of the case—the temperature sensor that is used to develop a temperature-compensated voltage to control the LCD. This repositioning allows us to eliminate the previously required costly and awkward cabling between the circuit board and the LCD-face region.

Another advantage of the present invention is that the case can be hermetically sealed. As a result, the air inside the unit can be kept clean and the inside surface of the window—as well as the LCD face—do not accumulate blown dirt.

A major advantage of the invention is that glare is reduced, without antireflection coating on the window. This advantage arises because, to consider the invention in terms of the first of its two major aspects mentioned above, the only reflection that is directed toward the viewer (superimposed on the directory entries) is a reflection of the underside of the hood—rather than the viewer's own image, or images of the sky or other objects behind the viewer.

The same advantage can be couched in terms of the second major aspect mentioned earlier: the window is substantially cylindrical. Such a window provides one, but not the only, mechanism for protecting the viewer from confusing superposed images. Using a substantially cylindrical-form window has at least one and possibly two further advantages:

First, it can be shown geometrically that with a suitably oriented cylindrical-segmental window it is possible to virtually guarantee—subject to some qualifications that will be presented in a later section of this document—that a viewer who looks at the LCD from in front of the LCD can see only one reflection: that of the undersurface of the top section of the hood.

To obtain this condition, if the window at its top edge is substantially tangent to the front wall of the case: (1) the top section of the hood should be made to extend outward from the front wall of the case beyond the center of curvature of the cylindrical segment that is the window—or in other words, the hood top section should extend from the front wall of the case by a distance just greater than the radius of curvature of the window—and (2) that radius should be equal to the sum of the squares of the viewing-aperture height a and bottom hood-section length b, divided by twice the latter length: $(a_2+b^2)/2b$.

(By "suitably oriented", however, we do not mean to imply that the window at its top edge must be substantially tangent to the front wall of the case. To the contrary, the desired effect can be obtained with a shorter hood if the upper edge of the window is canted back to a nonvertical orientation; however, this solution does tend to restrict viewing from lower angles.)

We do prefer that the hood extend outward by at least the window radius, and as will be recalled this is part of the second independent major aspect of the invention. This condition optimizes the efficacy of glare reduction by intercepting at the hood undersurface rays corresponding to the reflection of the viewer's line of sight.

Although this condition is easily satisfied, we have discovered that the limitations of the glare-reducing curved window in automotive applications are due to failure to observe this requirement. When the hood is not long enough, light from the sky above the viewer's head is more readily reflected into the viewer's eyes if the viewer's head is not precisely in the design position; and this is just what happens in the automotive situation.

The second, or possible second, advantage of cylindrical windows relates to another geometrical property: very generally speaking, a cylindrical window tends to reflect sunlight incident on the window to certain portions of the hood undersurface, and tends to reflect the viewer's gaze to different portions of the hood undersurface. As will be shown later, this selectivity is not absolute, rather being variable with time of day, height and position of the viewer, and portion of the LCD display being viewed.

Nevertheless these phenomena are present and significant—and tend to make the viewer's lines of sight congruent, by reflection at the window surface, with portions of the hood undersurface that are not strongly illuminated. The less strongly illuminated are superimposed reflections from a window, in general, the less confusion with objects viewed directly by transmission through the window.

As a practical matter, we are not certain just how much advantage is conferred in this way, because our invention works very well even without this effect. More specifically, at least if the hood undersurface is a dark color and not reflective, even brightly illuminated portions do not ordinarily cause significant—or usually even noticeable—confusing reflections.

It is possible, however, that under special circumstances a further important improvement in glare reduction may result from this differentiation between areas of the hood that are strongly illuminated and areas that are reflected into the viewer's line of sight. In particular the benefits of this effect may be important if the hood undersurface becomes very dusty (particularly if the dust is light in color), or if the site is subject to incidence of sunlight at very shallow angles (as when no building, tree etc. is present to block the light from the rising or setting sun).

We are not scientists and cannot fully assess the practical significance of all the theoretically available benefits of our invention. We have found, however, that it works and it works well.

Although the invention in its broad general forms as described above thus provides very significant advances relative to the prior art, nevertheless for greatest enjoyment of the benefits of the invention it is preferably practiced in conjunction with certain other features or characteristics which enhance its benefits. For example, we prefer that the display unit further comprise a glare-reducing material applied on the liquid-crystal display (but not on the window).

With respect to the invention in its above-mentioned "first aspect"—which is to say, characterizing the invention simply in terms of reflecting to the viewer only portions of the underside of the hood—we also consider it preferable that the window be curved. A planar window can be used, but a curved window is preferred because the hood length can be relatively shorter, the window itself is mechanically stronger, and more importantly the readability of the display unit is extended to lower viewing angles.

Further with respect to the first aspect of the invention, we prefer that at the top of the viewing aperture the curved window be substantially vertical, or in other words substantially tangent to the front wall of the case. The bottom of the window is thus projected outward from the plane of the front wall.

Preferably the hood structure too is extended outward from the bottom of the aperture (or if preferred from some point below the bottom of the aperture) to meet and support the bottom of the window. Side panels of the hood structure interconnect and stabilize the top and bottom hood sections, and also provide surfaces for holding the window in place.

For best resistance to vandals, we prefer to configure the hood in a strengthening folded rectangular form, using stainless steel, with an internal curved track or retainer on each of the inward-facing lateral panels to hold the window. We prefer to make the window of Lexan TM —a brand of extremely tough polycarbonate—heat-formed to the desired curvature described above. The folded steel hood and curved Lexan window mechanically reinforce each other very effectively.

Whether the window is cylindrical or not, we consider it preferable that the window reflect:

substantially all directly received sunlight upward and outward to the hood, and a viewer's own image upward and outward to the underside of the hood (rather than back toward the viewer), and outward to a viewer only light from a portion of the hood that receives no reflected sunlight near midday.

In addition, preferably the underside of the hood—what the viewer sees due to reflection at the window—is a very dark color, ideally black, and has a matte finish or is otherwise given minimum reflectance. The surface in any event should not be so bright as to make its reflection at the window noticeable, in comparison with the LCD characters seen through the window.

As already suggested, we prefer to retain the use of a temperature sensor, as in our earlier units, for monitoring the temperature of the LCD medium to permit automatic adjustment of the LCD contrast-control voltage. Because temperature variation within the case is greatly reduced by our present invention, however, as mentioned above the sensor now can be located directly on the electronics circuit board, thereby rendering the apparatus simpler and less costly.

The sensor controls the contrast-control voltage through a voltage-adjusting circuit that includes an analog-to-digital ("A/D") temperature-conversion stage and a digital electronic memory. This memory holds a lookup table for establishing desired contrast-control voltages for various temperatures.

After some experimentation we have come to prefer this system because the voltage requirement varies strongly with temperature, particularly toward the extremes of the temperature operating range, and is difficult to represent in closed form as by a formula. We prefer to include A/D conversion of temperature because representing the voltage-temperature relationship with an analog circuit is relatively difficult and expensive.

Because that relationship is difficult to represent in closed form as by a formula, we prefer to use a look-up table. This approach has the added benefit of allowing us to easily change the relationship to account for differences in display lots or even different displays we might subsequently use.

We also prefer to provide a heater for raising the LCD temperature, and to provide "heater-controlling means" for operating the heater only when needed. The heater-controlling means are also responsive to temperature.

The LCD face may be guarded against glare by either a matte finish or an antireflection coating as suggested in our previous applications. For this purpose we now prefer a matte-surfaced film with a multilayer antireflection coating, available from Optical Coating Laboratories Inc., Santa Rosa, Calif. as its type HEA2000.

As mentioned earlier, prior to our earlier invention all electronic directories required local programming, either at the unit or through a computer close by, via a hardware connection. Our electronic directory system can instead be programmed remotely from any location via telephone line, using either a modem and terminal or a tone-transmitting telephone by itself. In the latter case, our electronic directory system provides synthesized voice responses to supply status and progress information to the programmer over the telephone.

Our system can also be programmed locally, using a very inexpensive handheld membrane-type alphanumeric keypad that plugs into the system electronics directly. Alternatively, the system can also be programmed using a twelve-button keypad on the front panel of the system.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

Figure 1:
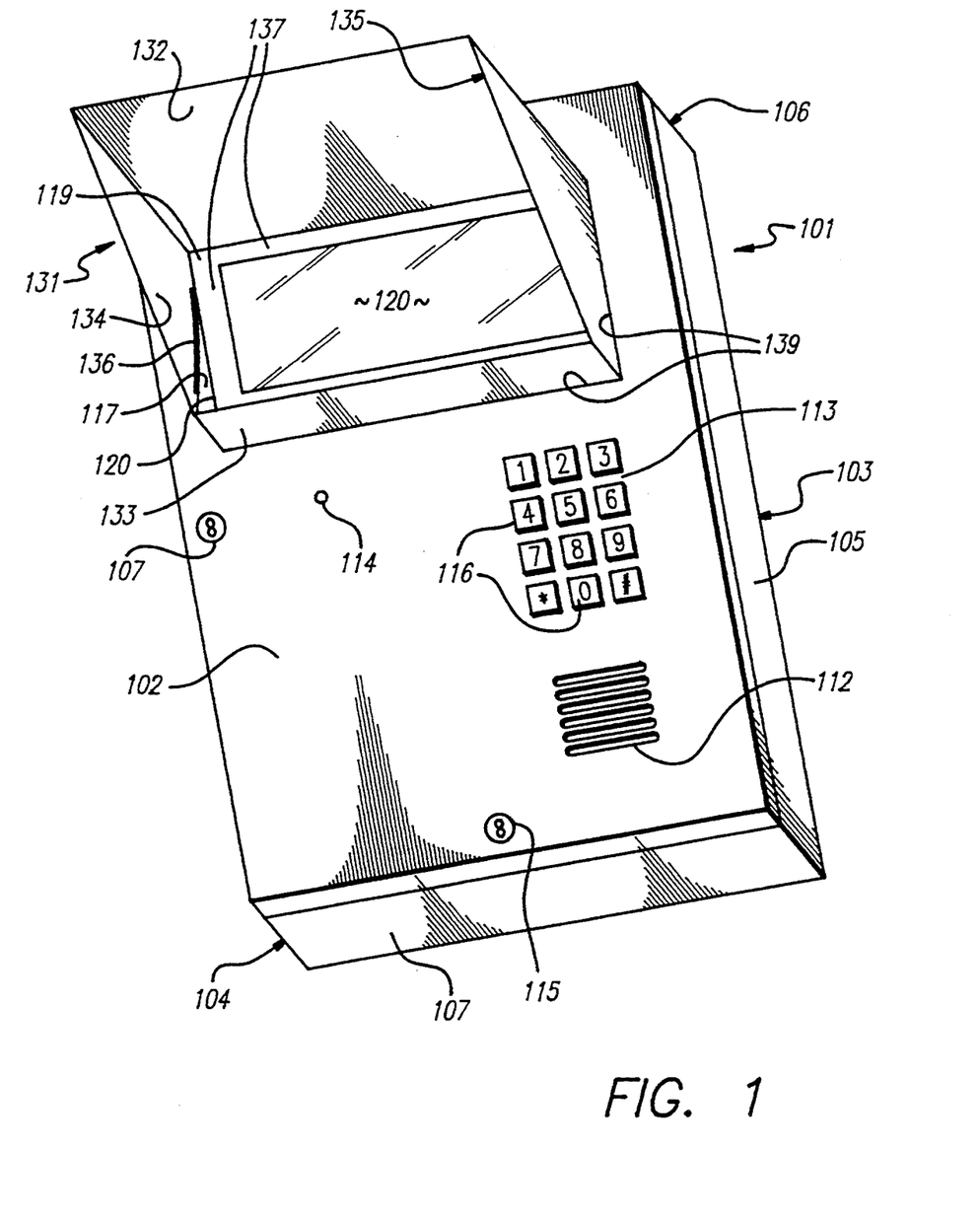
FIG. 1 is an exterior perspective drawing, taken from slightly below and to one side, of a display unit that is a preferred embodiment of our invention.
Figure 2:
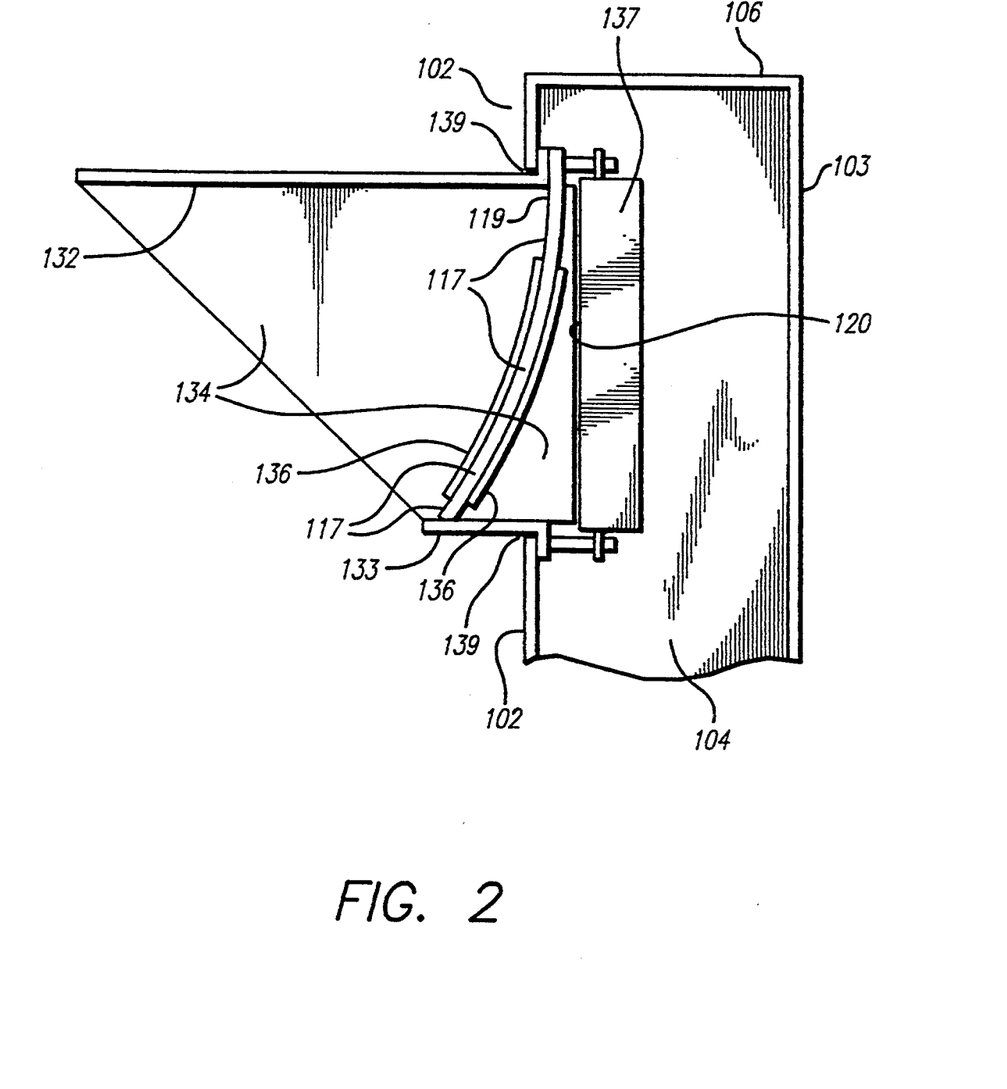
FIG. 2 is an interior side elevation, partly in section, of the FIG. 1 embodiment of the invention.

As seen in FIGS. 1 and 2, the preferred embodiment of our display unit has a case 101 that includes a front panel 107. The case 101 also includes a rear wall 103, left and right side walls 104, 105, a ceiling 106, and a floor 107. We prefer to make the front panel stainless steel and the case painted cold-rolled steel.

The front panel 102 is hinged to the right wall 105, and provided with a keyed lock 107 that engages a strike groove formed in the left wall 104 to secure time front panel firmly against the rear parts 103-106 of the case. Formed in the front panel 102 are a viewing port or aperture 139, louvres 112 and an array of twelve small square access holes 113, a small hole 114 and a larger hole 115.

The louvres 112 are provided for transmission of sound from an audio speaker (not shown) that is mounted behind the front panel 102. The square access holes 113 accommodate twelve pushbuttons of a standard telephone-type pushbutton array 116. The small hole 114 allows for transmission of sound to a microphone (now shown) that is mounted directly behind the hole. The larger hole 115 is for installation of a post-office key lock. If this lock is not used, a plug fills the hole.

The hood structure 131 projects forward (from the front wall 102 of the case) at the bottom of the window aperture 139, as well as at the top. FIG. 1 shows that the top and bottom hood sections 132, 133 are interconnected by tapered side panels 134, 135 for strength and some exclusion of laterally approaching ambient light.

Figure 3:
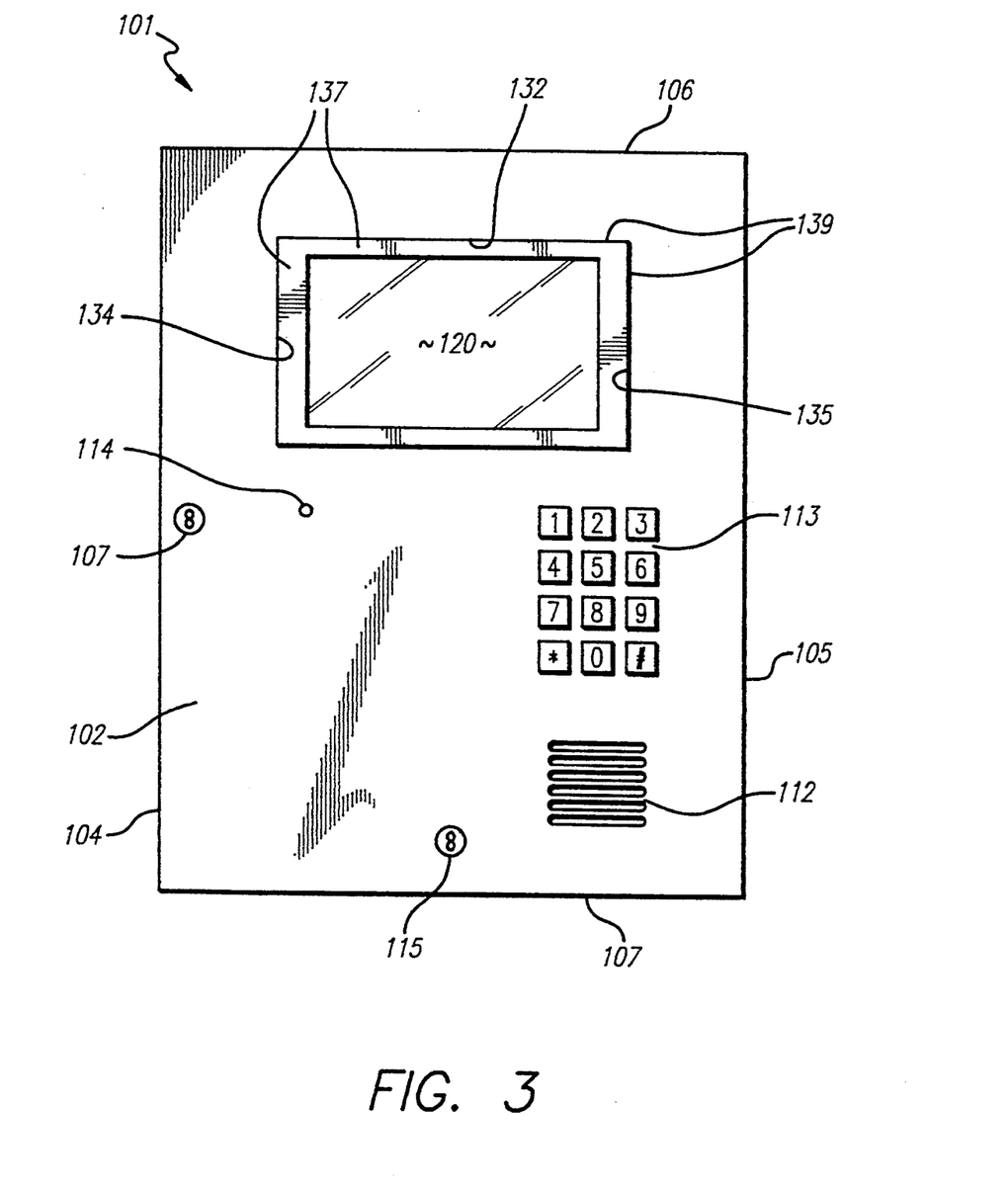
FIG. 3 is a front elevation of the same embodiment.

Securely mounted in tracks 136 carried on inward-facing lateral surfaces 134, 135 of the hood 131 is the polycarbonate viewing window 117, which carries no antireflection coating. Behind the window 117 is an LCD 120, preferably six to eighteen rows of twenty-six to forty characters each. A bezel 137 inside the case, within the boundary of the viewing aperture 139, guards the edges of the LCD face 120. The bezel, integral with the LCD, wraps around the top, bottom and sides of the LCD and accordingly is seen face-on in FIG. 3 as well as FIG. 1.

As previously explained, the window 117 is preferably curved—and more specifically concave upward and outward, and preferably substantially cylindrical—to reduce "glare" (as defined above) sufficiently that the LCD 120 can be read. The latter function is particularly important when the LCD is facing away from the incident sunlight.

When that is so, the person attempting to read the LCD is facing into the sun, and is brightly illuminated. Under these circumstances the reflected image of the person's own face and surroundings, as would be seen in a generally planar window, could be extremely bright and could almost totally obscure the LCD. (In our earlier units this problem was overcome by provision of an antireflection coating.)

As to the detailed geometry of the hood (and window), our research revealed a family of different solutions. These can be described using the assumption that the window 117 should be substantially vertical at its top edge 119. We believe that this assumption tends to minimize the size of the window and the hood.

As one extreme solution (not illustrated), the top section of the hood can be minimized in length by making the top and bottom sections (corresponding to 132, 133 in the illustrated embodiment) equal in length, and selecting a window curvature that brings the outward bottom edge of the window into tangency with the bottom section of the hood. This solution is objectionable in that the bottom characters of the display would not be readily visible to people whose eyes would be at a low level relative to the display.

That includes not only children and other relatively short people, but also wheelchair users, automobile drive-up directory users, etc. Furthermore, even for users who would be able to look directly into the device—for example, along an essentially horizontal line of sight—the equal lengths of top and bottom sections would produce a sort of tunnel effect that would be unpleasant.

At the other extreme, in purest mathematical principle the window would be entirely flat (radius of curvature infinite), the bottom section of the hood zero length, and the top section accordingly of infinite length. Of course a hood of great length would be impractical or at least very uneconomic.

An intermediate solution of optimum economics can be selected using certain other needed input parameters: (1) the aperture height a of the display to be used, (2) the vertical and horizontal distances from the bottom edge of the case aperture to the bottom line of characters of the display, and (3) the assumed vertical and horizontal distances from that line of characters to the lowest eye position which is to be accommodated.

Items (2) and (3) suffice to permit straightforward calculation of the greatest permissible bottom-section length b of the hood. That distance b in conjunction with item (1), the aperture height a—and the assumption of window verticality at the top of the aperture—permit similar calculation of the radius of curvature of the window using the formula presented earlier.

Figure 2A:
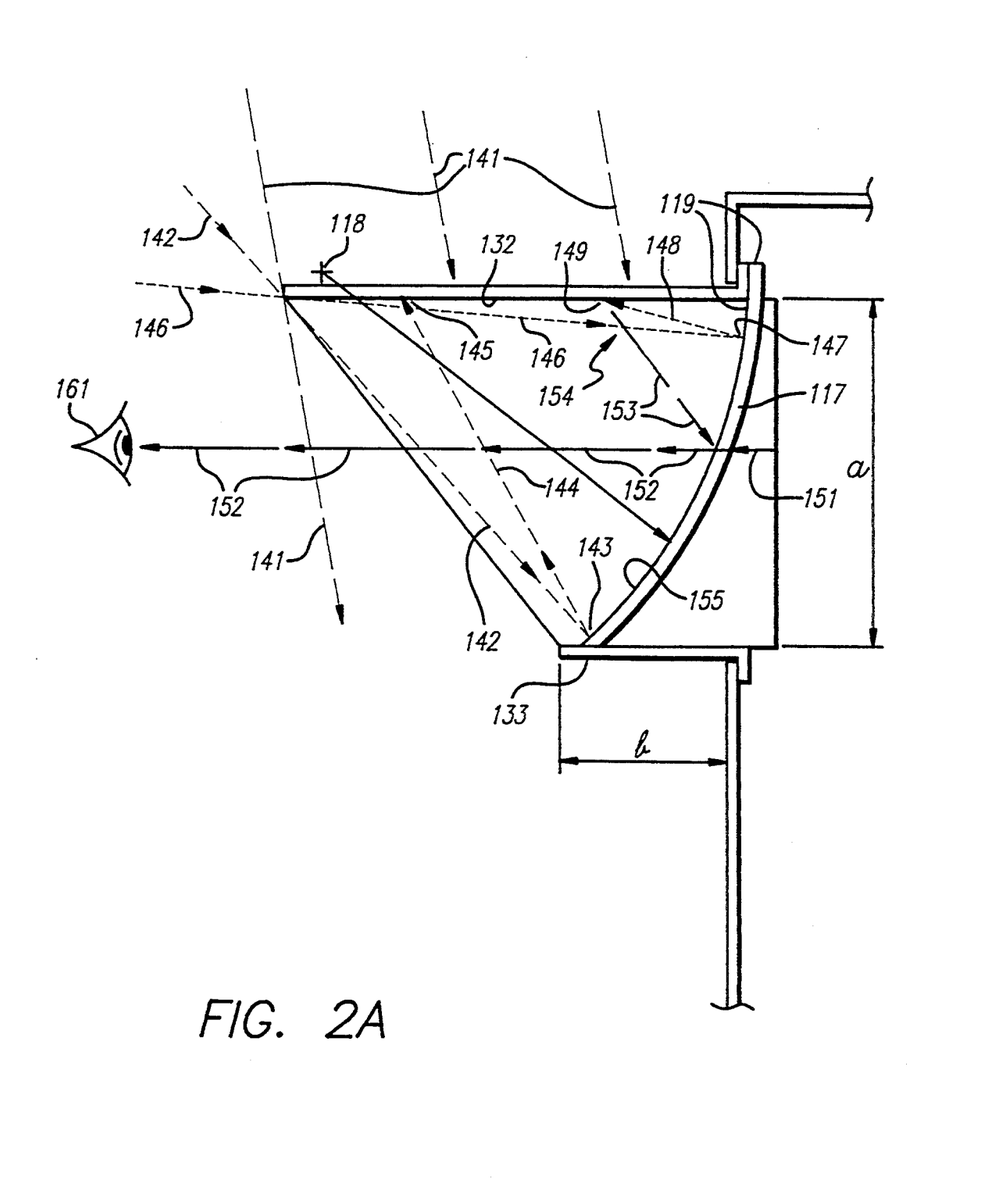
FIG. 2A is a like elevation showing geometrical construction lines representing various light rays related to the glare-reduction and heat-load-reduction characteristics of the invention.

That radius in turn yields the forward extension of the top section of the hood: the hood length should be just greater than the radius, or to put it another way the top section 132 of the hood extends just beyond the center of curvature 118 (FIG. 2A). As will now be clear, different display sizes and different installation arrangements call for different window curvatures and thus different hood configurations and sizes.

We shall offer next a discussion of the selective reflection effects mentioned earlier in this document. As stated in that discussion, we are not yet certain how important these effects are in practical operation of our invention.

FIG. 2A shows that very steeply angled rays 141 of direct midday sunlight either are captured by the hood top section 132 or miss the apparatus entirely. Rays 142 incident near midday and therefore slightly less steeply can strike only the lowest portions 143 of the window 117, and from those portions much of the optical energy is necessarily (by virtue of the properties of the window acting as a cylindrical reflector) redirected along trajectories 144 to the forwardmost area 145 of the hood undersurface 132.

Only very shallowly incident rays 146—occurring only very early or late in the day and therefore ordinarily much less intense than at midday—can be reflected as along paths 148 to reach the rearwardmost portions 149 of the hood undersurface 132. At those times the undersurface is illuminated from the front nearly all the way to the back.

It will be understood that at intermediate times of day the reflections are distributed along the underside 132 of the hood, from the front toward—but not to—the rear portions 149.

Meanwhile the viewer's eye 161 is trained upon the LCD, as the viewer seeks to receive information contained in—for example—horizontal rays 151 from the LCD. These horizontal rays pass through the window 117 and continue as rays 152 to the eye 161, but at the window surface mingle with whatever rays 153 are reflected at tile corresponding or congruent angle from portions 154 of the hood undersurface 132.

Consideration of horizontal paths that are higher or lower will confirm that, almost regardless of eye level, horizontal rays from the LCD (but not necessarily through the topmost part of the window from the bezel) will be confused only with light reflected from relatively rearward regions 154 of the hood underside 132. We give that surface a black matte finish so that most of the illumination that does reach those rearward regions 154 is absorbed, and much of the small residual is scattered omnidirectionally—so that very little light is scattered from area 149 within the pencil 153, 152 to compete with rays 151 from the LCD.

Thus for a viewer looking horizontally at the center of the LCD, glare is substantially eliminated. It is also readily seen from study of the drawing that there is no angle of view, for any eye position outside the hood, that allows specular reflection at the window into the viewer's eyes from the sky or any other background source It remains to consider whether there is any angle of view at which information in rays from the LCD can be confused by light reflected from the most intensely illuminated forward portions 145 of the hood undersurface 132. Because the hood top section 132 extends just beyond the window center of curvature 118, and in specular reflection the incident and reflected rays form equal angles about the radius to the point (or in this case line) of reflection, the brightest reflected illumination—ordinarily occurring at midday—strikes the underside of the hood just behind the center of curvature.

In order for the viewer's eye to receive, by reflection from the same surface, light from that most-intensely illuminated region, the viewer's eye would have to be positioned along the path of incidence—which is to say, with the viewer's head partially within the hood. If the viewer is in that position, the viewer's head will obstruct much or all (depending on the width of the display) of the incoming sunlight under consideration; and to the extent that any incoming sunlight remains troublesome the viewer will perceive that this situation can be eliminated by moving just slightly away from the apparatus.

At times near midday, when incoming sunlight is intermediate between the illustrated steep and shallow paths 142 and 146, that light is reflected to generally forward-to-intermediate regions of the hood. If the viewer in position 161 of FIG. 2A looks at the forwardmost lower edge of the window, the viewer may be able to see some of those regions; however, that part of the window will appear to be below the bottom edge of the LCD, and therefore will not make any part of the LCD hard to read.

As the viewer in position 161 looks instead at the bottom edge of the LCD, through the point marked 155 in the drawing, the point along the hood which is imaged in confusion with the LCD is shifted rearward of the area that is illuminated by reflected sunlight. If the viewer looks at any portion of the screen other than the bottom, the optically congruent area of the hood is even further back from the brightly illuminated portion.

At progressively even earlier and later times, the area of the hood that is brightly illuminated progressively overlaps with the area that is reflected into the viewer's field of interest. Ordinarily the illumination at those times of day is even less intense, and the black matte undersurface of the hood attenuates the light redirected toward the window. During unusually bright early mornings and late afternoons, it is theoretically possible for the double-reflected light from the overlap areas to cause slight difficulty in reading the LCD.

In such a situation the viewer will instinctively perceive that this difficulty can be overcome simply by lowering the point of view 161 very slightly, to sight at the LCD area of interest along a line that is inclined very slightly upward—or not inclined quite as much downward. The result is to force the congruent area to be the very rearmost part of the hood 19 undersurface, and this is a region which never receives significantly bright illumination.

The foregoing analysis has been offered for completeness; it is not yet clear in what situations these considerations may be important. Our invention, however, essentially eliminates glare regardless of viewing angle, portion of display viewed, time of day, etc.

Resulting dimensions for our most highly preferred embodiment, which we believe makes an ideal working tradeoff for various field applications, appear in a tabulation several paragraphs below.

Our earlier units employed six metal extenders, spaced along the top and bottom edges of the viewing port, to stand the LCD off from the rear surface of the front panel and thereby define an air space between the viewing window and the LCD. This provision was satisfactory except for the relatively small additional or differential cost of making the case deep enough (i.e., large enough in the front-to-back direction) to accommodate this space—and the corresponding cost of accommodating the case with this added depth. If desired the case may be made shallower to exploit the potential saving that results from eliminating the air-space requirement in accordance with the present invention.

Our earlier units also employed ventilating fans and plena. The fans and plena, as well as the circulating-air space, are all unnecessary in preferred embodiments of our present invention.

The LCD itself is preferably a Model LM64015T supertwist type made by Sharp Corporation. The manufacturer currently provides this unit with a bezel 137 preattached, as mentioned earlier. With respect to performance of our present invention, we believe that an LCD with a different bezel or no bezel could serve as well.

The display can be operated from a microprocessor or even a personal computer or other microcomputer, in very generally conventional fashion. We prefer, however, to use novel electronics and software which we have developed. These additional subsystems optimize the performance of the display as part of a novel programmable electronic directory system, as will be described shortly.

Mounted to the system circuit board (rather than immediately behind the window as in prior forms of our apparatus) is a thermistor element (not shown). As in our earlier apparatus, this thermistor is excited and monitored by portions of the electronic circuitry (not shown) within the case 101, and the resulting temperature information is used to control the LCD contrast voltage.

A small strip heater (not shown) is advantageously mounted behind the LCD 120. Also as in our earlier units, this heater too is temperature-controlled but need not be made responsive to the thermistor. The heater element itself is self regulating: its resistance increases with temperature, tending to reduce heat output. The heater can be a twelve-volt d. c. model CDH 00310 commercially available from Midwest Components, Inc. of Muskegon, Mich.

Approximate dimensions of the apparatus are collected below.

|  |  | cm | inches |
|---|---|---|---|
| case 101 | height | 53½ | 21 |
|  | width | 42 | 16.5 |
|  | depth | 11 | 4.3 |
| port 139 | height | 17½ | 6.9 |
|  | width | 27½ | 10.8 |
| window 117 | height (when flat) | 18 | 7.1 |
|  | radius of curvature | 21 | 8.3 |
|  | width | 27 | 10.6 |
|  | thickness | 0.3 | 0.13 |
| hood 131 | width | 27 | 10.7 |
|  | height | 17½ | 6.8 |
|  | depth | 21 | 8.3 |

Thus our invention encompasses several important innovations relating to provision of a high-resolution, high-contrast, essentially glare-free display for electronic directories and the like. It is particularly advantageous in outdoor installations, and in building entries or lobbies where temperature and brightness of illumination are not well controlled.

Our invention further encompasses important innovations in a programmable electronic directory system. These innovations will be described herebelow.

Prior to the invention described in the parent patent applications, and herein, electronic directory systems had to be programmed at the directory unit itself or by a computer close by. Our invention allows for programming of the directory from a remote location over the telephone lines using a modem and terminal or by using a standard tone-transmitting telephone by itself. The system can also be programmed locally using a handheld programmer 201 (FIG. 4), or through a keypad 202 or RS-232 communications port 203 that is part of the system. Thus, in addition to providing both remote and local programming capabilities in the same machine, the system is capable of managing a multiplicity of programming input devices. Moreover, the system can be reprogrammed while it is being used without the programmer or the user realizing the other party is using the machine. However the system is programmed, names are automatically alphabetized and put in their proper location on the directory.

Figure 4:
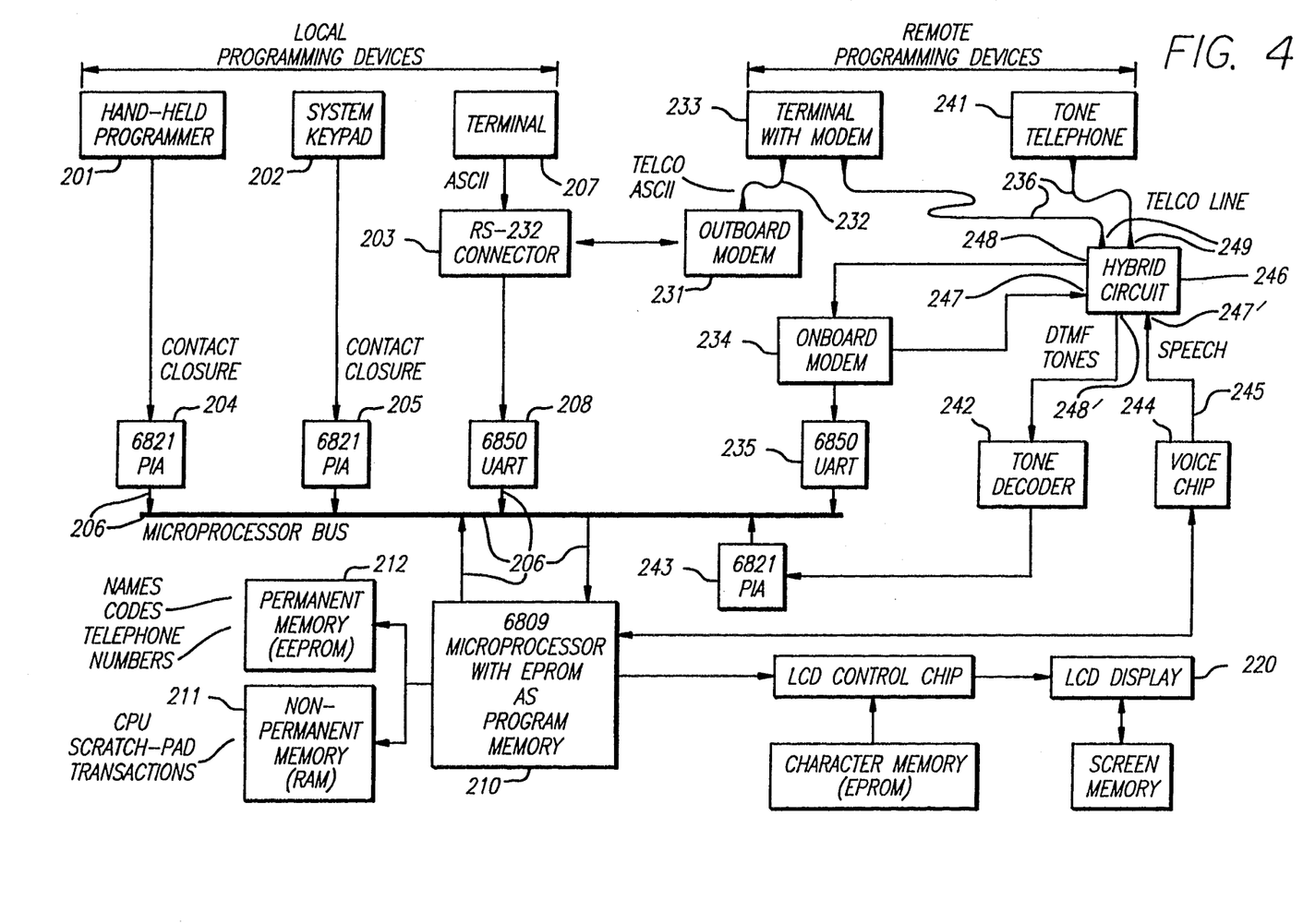
FIG. 4 is a block diagram of the programming processing flow for the system and shows the different programming devices that can be used along with the major electronic components used to process their input.

FIG. 4 gives an overview of the programming processing flow and shows the different programming devices that can be used along with the major electronic components used to process their input. Local programming is generally done using a handheld programmer 201 of our own design (pictured in FIG. 5) which plugs directly into the system electronics via a ribbon cable 271. The programmer is a membrane keypad that simply provides contact closure output for alphabetic characters 272, numerals and other phone-system characters 273, and standard computer-keyboard functions 274, as well as directory and access functions 275. As a result, it is extremely rugged, very thin, small sized, and very inexpensive.

Figure 5:
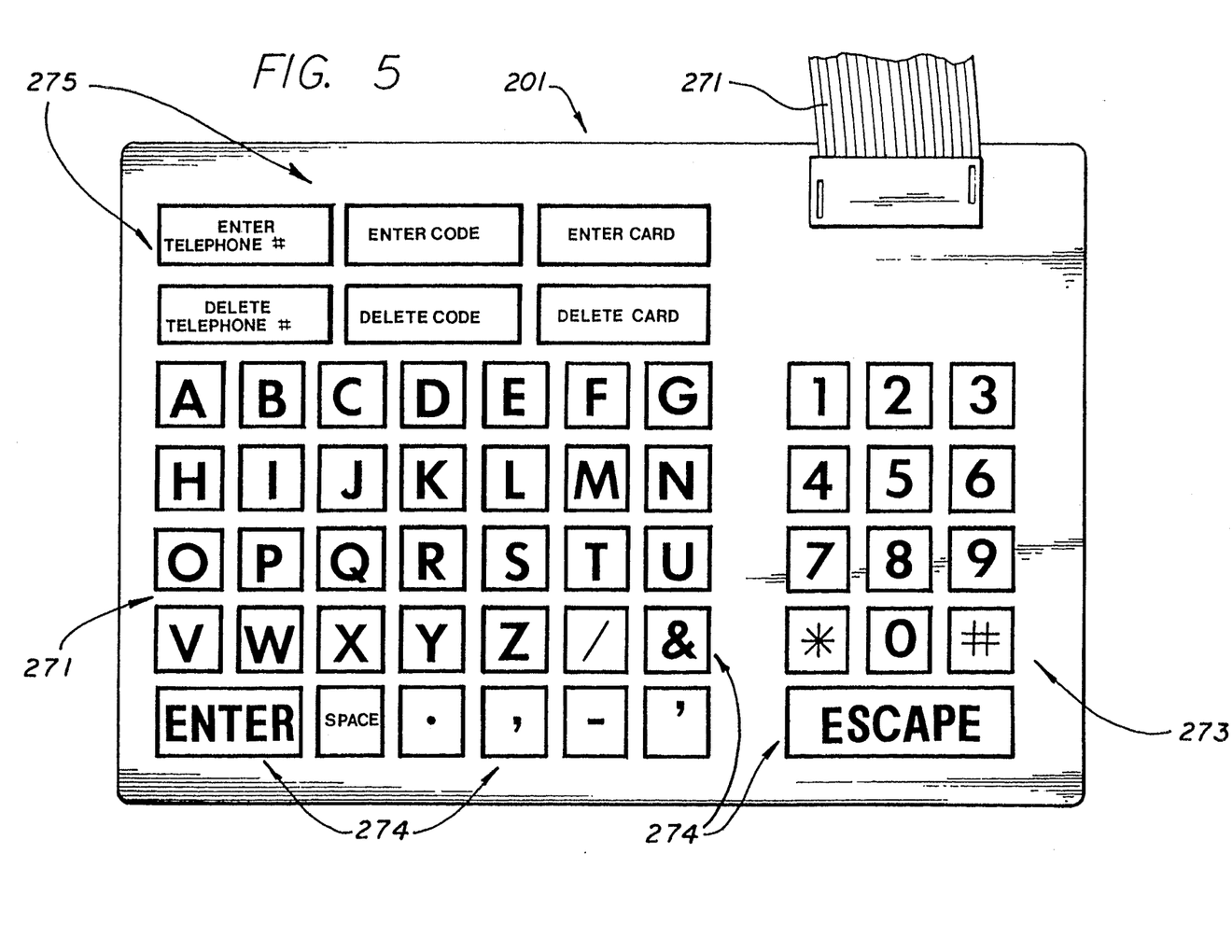
FIG. 5 is a picture of our handheld programmer—one of the devices used to program the system manually at the system.

As can be seen from the graphics on the keypad, it as well as our system can do substantially more than provide for an electronic directory. In one of its forms, the system can be a complete access control system providing for both occupant and visitor access control, using card or code entry for occupants and telephone entry for visitors. In this system configuration, the electronic directory would normally be part of the telephone entry function for visitor access control. The microphone and the speaker are for communications between the visitor and the person being contacted in the building whose name is listed on the electronic directory. This system configuration is, however, only one form in which the electronic directory could be used and in no way is intended to limit the scope of our claims.

The twelve-button keypad 113/116 (FIGS. 1 and 3), 202 (FIG. 4), which also provides simple contact closure output, can also be used to program the system locally. In this instance, two-digit numbers are used to encode letters. While the keypad 113/116, 202 is more cumbersome for alphanumeric programming, it is a useful back-up in case the user has misplaced the handheld programmer 201.

The contact closure outputs of the handheld programmer 201 and system keypad 113/116, 202 go to separate PIAs (Parallel Interface Adapters) 204, 205 and then via a bus 206 to the system microprocessor 210. We use a Motorola 6809 microprocessor and Motorola 6821 PIAs. The PIAs 204, 205 serve to expand the available ports on the microprocessor 210 and have hardware interrupts (each being a pin on the chip that is in a high or low state) to alert the microprocessor 210 that data are on the PIA and ready to be retrieved. Once the microprocessor has retrieved those data from a single keypress, it loads them into RAM (random access memory) 211 and displays them on the LCD 220 (120 in FIGS. 1 ff.) with programming prompts and messages. When a data entry from one or more keypresses has been completed the data are then loaded into an EEPROM (electrically erasable programmable read only memory) 212 where they reside until erased. We use an EEPROM as permanent memory for its nonvolatility—the ability to keep its memory contents without any external power. The EEPROM 212 we use is a Samsung 2864.

The third method of local programming is via the system RS-232 port 203 using any RS-232 compatible device (e.g., a terminal 207). Since the baud rate on the system RS-232 port 203 is selectable (300, 1200, 2400, and 4800), the port will accommodate a wide range of devices 207. The serial ASCII data that enter through the RS-232 connection 203 proceed to a UART (Universal Asynchronous Receiver/Transmitter) 208 which converts the serial data to parallel data—and also has a hardware interrupt to alert the microprocessor 210 that it has data. We use Exar88C681 UART. The microprocessor handles the data in the same way as those from the handheld programmer 201 and keypad 202, except that it displays these data on the device 207 connected to the RS-232 port 203 (e.g., the video screen that is part of the terminal 207).

The RS-232 port 203 also provides a means of remote programming in that a modem 231 can be connected to the RS-232 port 203 and thus allow communications with the system over the telephone lines 232 from a remote location having a modem and terminal 233. Our system also has an onboard modem chip (Rock-well RC224AT) 234, which eliminates the need for an outboard modem 231. An outboard modem 231 would be used only if a baud data transmission rate faster than 2400 were desired. A so-called "dumb" terminal 207, 233, as opposed to a personal computer (PC), can be used in either case since all the necessary intelligence resides in our system.

The serial ASCII data from the onboard modem 234 is sent to a UART 235 and then to the microprocessor 210. Data entries and system prompts are sent back to the modem 234—which then transmits them over the telephone line 236 to the modem and terminal 233 at the remote location, where they are displayed on the video screen.

A standard tone telephone 241 can also be used to program the system from a remote location. The DTMF (Dual Tone Multifrequency) tones are received by a tone decoder chip (Mitel 8870) 242 in the system electronics; that chip 242 decodes the frequencies by comparing them to a crystal oscillating at 3.579545MHz.

The decoder chip 242 represents the decoded frequency in digital form, which is then sent through a PIA 243 to the microprocessor 210. The decoder chip 242 has a hardware interrupt, as does the PIA 243, for notification that data is ready for transmission.

The microprocessor 210 processes the data as before except that instead of data and prompts being displayed on a screen, a voice chip (NEC D7759C) 244 generates synthesized voice responses and prompts 245 which are sent back over the previously mentioned telephone line 236 to the phone 241 and programmer at the remote location.

The ability in the same electronic directory unit to accommodate programming either by modem 234, 233 or by tone telephone 241, using just one telephone line for the system, is not straightforward and is another novel aspect of our invention. Other electronic directory systems have neither capability.

As far as we are aware, all other types of systems that do support both means of programming (e.g., electronic banking systems) require two telephone lines, one for modem programming and the other for tone programming. The difficulty is that the apparatus must distinguish the incoming signal types from a common input source—in this case the unknown type of telephone call being answered.

We accomplish this by using an active hybrid circuit 246. The hybrid is an analog three-port circuit design having an input port 247 247', an output port 248, 248' and an input/output port 249 that enables concurrent testing for either an incoming modem signal or a DTMF signal. Outputs of the modem 234 transmitter section and voice chip 244 are fed to the input port 247 and both the modem 234 receiver section and the DTMF receiver 242 inputs are connected to the output port 248, 248' of the hybrid 246. The telephone-line 236 interface feeds signals both into and out of the input-/output port 249 of the active hybrid 246.

When the system is called, it senses the ring signal on the line 236 and integrates these occurrences over a period of time to avoid falsely answering on noise pulses. The system then answers by seizing the line 236 and, after a 2.2-second delay, answers in English speech 245 by saying, "Hello."

The system then presents the modem 234 answering tone and listens concurrently for either an origination tone from a possible modem originating station 233 or a DTMF tone from a possible phone 241. If an origination tone from a modem 233 is detected, the unit will ignore subsequent DTMF tones. Conversely, if a DTMF tone is detected, the unit turns off its modem 234 answering tone, ignores any subsequent modem frequencies, and obeys only the incoming DTMF commands.

Another feature of the active hybrid 246 is cancellation of leakage between the input port (transmitter output) 247, 247' and the output port ( receiver input ) 248, 248'. This is accomplished by mathematical relationships that are inherent in the design.

When the sidetone balance (the relative impedance of the system vs. the phone line 236) is adjusted properly, a close impedance match to the telephone is achieved and a high degree of output-to-input leakage suppression results. This condition makes it possible to multiplex both the modem 234 and the DTMF receiver 242 on the same telephone line 236, since the modem 234 transmitter cannot overpower the sensitive input stage of the DTMF receiver 242.

Finally, as mentioned earlier, one of the forms of our electronic directory system is as part of an access-control system. When used in this configuration, the system has a buffer memory (part of RAM 211) capable of automatically storing the last several thousand transactions.

Transactions include entries made using cards or codes, entries granted by telephone, as well as alarm conditions and the like. If the transaction buffer is filled, the oldest transaction is deleted when a new transaction is entered. Information recorded for each transaction includes transaction time, date, type, and entry point; and card or code used, attached name, and action taken (e.g., access granted or denied).

Our system allows these data to be retrieved when the system is in the programming mode, either locally 201-208 or remotely 231-249, by display on the system LCD 220, a printer (not shown), or a terminal 207, 233, depending on the programming mode as discussed earlier. The chip (part of RAM 211) we use for the transaction buffer memory is an RCA 6264 eight-thousand byte RAM or an RCA 62256 thirty-two thousand byte RAM. The size depends on the maximum number of transactions to be retained.

We have also created a software program on floppy disc that allows the data in the transaction buffer to be sorted after it is retrieved. Sorting can be by date, time, source and type of transaction; and by code used, name, and action taken. Thus, a user can focus more narrowly on the specific transactions the user wishes to review.

The program also allows the programmed information stored in the system EEPROM memory 212 (e.g., names on the directory, codes, telephone numbers, etc.) to be downloaded to a floppy disc. Thus, a back-up disc file of the system memory can be maintained.

This is a particularly attractive feature with directory units having the capacity for a large number of names, where loss of the system memory (e.g., due to lightning strike) would necessitate reprogramming many names.

With this floppy-disc program, the names on the back-up disc file can simply be uploaded to the affected system once it is back in commission.

This floppy-disc program can be used in any IBM-compatible PC with DOS 2.0 or higher. The PC can be connected directly to the system via RS-232 connection 203 or it can communicate with the system via modem 231, 234—since the floppy-disc program includes the terminal-emulation and communications software necessary for a PC to be able to communicate via modem 231, 234.

It will be understood that the foregoing disclosure is intended to be merely exemplary, and not to limit the scope of the invention—which is to be determined by reference to the appended claims.

We claim:

1. A display unit for an electronic directory that is exposed to sunlight; said display unit comprising:
   a case including a front wall;
   a liquid-crystal display mounted within the case and comprising a face for displaying directory information in the form of a directory;
   an aperture defined in the front wall for viewing the display face;
   a hood mounted to the front wall of the case, extending outward therefrom at the aperture and dimensioned to shade substantially the entire aperture from sunlight at midday; said hood having an undersurface;
   an external window mounted to the case to protect the liquid-crystal display; said window being shaped, disposed and oriented to reflect into a viewer's eyes substantially only the undersurface of the hood, if the viewer looks at the LCD from in front of the LCD; and
   solid-state digital electronic circuitry, electrically interconnected with the liquid-crystal display, for electronically storing directory information and for controlling the liquid-crystal display unit to automatically exhibit stored directory information in the form of a directory having multiple listings in an alphabetical or like order or in classified groupings.

2. The display unit of claim 1, wherein:
   the window reflects substantially all directly received sunlight upward and outward to the hood.

3. The display unit of claim 2, wherein:
   the window reflects light from a viewer's own image upward and outward to the hood, if the viewer looks at the LCD from in front of the LCD.

4. The display unit of claim 3, wherein:
   the window reflects outward to a viewer substantially only light from a portion of the hood that receives no reflected sunlight near midday, if the viewer looks at the LCD from in front of the LCD.

5. The display unit of claim 1, further comprising:
   a glare-reducing material applied on the liquid-crystal display.

6. The display unit of claim 1, wherein:
   the window is curved.

7. The display unit of claim 6, wherein:
   the curved window is upward- and outward-concave.

8. The display unit of claim 6, wherein:
   the curved window is substantially in the shape of a portion of a cylindrical surface; and
   the hood extends outward from the front wall of the case beyond the center of curvature of the cylindrical-portion window.

9. The display unit of claim 6, wherein:
   the hood also has a lower section that extends outward from generally a bottom edge of the aperture, to generally meet the window at the bottom edge of the window.

10. The display unit of 1, wherein:
    the aperture has a height a;
    the lower section extends outward by a distance b relative to the front wall of the case; and
    the window is in the shape of a portion of a cylindrical surface and has a radius of curvature approximately equal to $(a^2+b^2)/2b$.

11. The display unit of claim 10, wherein:
    the underside of the hood is very dark in color.

12. The display unit of claim 11, wherein:
    the hood also has lateral interconnecting panels that carry tracks for securing the window.

13. The display unit of claim 12, further comprising:
    a glare-reducing material applied on the liquid-crystal display.

14. The display unit of claim 8, further comprising:
    a glare-reducing material applied on the liquid-crystal display.

15. A display unit for an electronic directory that is exposed to sunlight; said display unit comprising:
    a case including a front wall;
    a liquid-crystal display mounted within the case and comprising a face for displaying directory information in the form of a directory;
    an aperture defined in the front wall for viewing the display face;
    a window substantially in the shape of a portion of a cylindrical surface and mounted to the case at the aperture to protect the liquid-crystal display;
    a hood mounted to the front wall of the case, extending outward from the front wall of the case beyond the center of curvature of the substantially cylindrical-portion window; and
    solid-state digital electronic circuitry, electrically interconnected with the liquid-crystal display, for electronically storing directory information and for controlling the liquid-crystal display unit to automatically exhibit stored directory information in the form of a directory having multiple listings in an alphabetical or like order or in classified groupings.

16. The display unit of claim 15, wherein:
    the substantially cylindrical-portion window is concave upward and outward.

17. The display unit of claim 15, wherein:
    the window is substantially tangent to the front wall of the case near the top of the aperture.

18. The display unit of claim 16, wherein:
    the window is concave outward and upward, and substantially tangent to the front wall of the case near the top of the aperture.

19. The display unit of claim 17, wherein:
    the window reflects light from a viewer's own image in a direction other than back toward the viewer.

20. A vandalism-resistant display unit for an electronic directory, comprising:
    a substantially vandalism-resistant case including a front wall;

a liquid-crystal display, mounted within the case, and having a display medium and a structure for containing the display medium;

the liquid-crystal display structure comprising a face disposed in front of the medium, for displaying directory information outdoors in the form of a directory;

means for protecting the liquid-crystal display against vandalism and for maintaining the temperature of the liquid-crystal display medium and structure between practical operating limits for the display, notwithstanding ambient temperature and humidity variations over generally normal ranges for at least the temperate zones, and even if the display unit is placed to receive direct sunlight when the sun is out; the protecting and temperature-maintaining means comprising:

an external window mounted to the case in the front wall to protect the liquid-crystal display, and means for reducing glare from the window and reducing solar heat loading into the case through the window, said glare-and-heat-loading reducing means comprising:

(i) a hood mounted to the front wall of the case, extending outward therefrom above the window, and dimensioned to shade substantially the entire window from sunlight at least at midday, said hood having an underside, (ii) configuration of the window in a curved shape, generally concave upward and outward, to reflect into a viewer's eyes only light from the underside of the hood, if the viewer looks at the LCD from in front of the LCD; and solid-state digital electronic circuitry, electrically interconnected with the liquid-crystal display, for electronically storing directory information and for controlling the liquid-crystal display unit to automatically exhibit stored directory information in the form of a directory having multiple listings in an alphabetical or like order or in classified groupings.

21. The display unit of claim 20, wherein:
the curved shape of the window is substantially in the shape of a portion of a cylindrical surface; and
the hood extends outward from the front wall of the case beyond the center of curvature of the cylindrical-portion window.

22. The display unit of claim 20, wherein:
the window reflects substantially all received sunlight upward and outward to the hood, and light from a viewer's own image upward and outward to the hood, if the viewer looks at the LCD from in front of the LCD.

23. The display unit of claim 20, wherein:
the window reflects outward to a viewer only light from a portion of the hood that receives no reflected sunlight near midday, if the viewer looks at the LCD from in front of the LCD.

24. The display unit of claim 20, wherein:
the glare-and-heat-loading reducing means further comprise a glare-reducing material applied on the liquid-crystal display.

25. A vandalism-resistant and weather-resistant display unit for an outdoor-installed electronic directory, comprising:
a substantially vandalism-resistant and weather-resistant case for outdoor installation, said case including a front wall, side-wall structure, and a bottom wall;

a liquid-crystal display, mounted within the case, and having a display medium and a structure for containing the display medium;

the liquid-crystal display structure comprising a face disposed in front of the medium, for displaying directory information outdoors in the form of a directory;

means for protecting the liquid-crystal display against vandalism and rainwater and for maintaining the temperature of the liquid-crystal display medium and structure between practical operating limits for the display, notwithstanding ambient temperature and humidity variations over generally normal ranges for at least the temperate zones, and even if the display unit is placed to receive direct sunlight when the sun is out; the protecting and temperature-maintaining means comprising:

an external window mounted to the case in the front wall to protect the liquid-crystal display, and means for reducing glare from the window and reducing solar heat loading into the case through the window, said glare-and-heat-loading reducing means comprising:

(i) a hood mounted to the front wall of the case, extending outward therefrom above the window, and dimensioned to shade substantially the entire window from sunlight at midday, said hood having an underside, (ii) configuration of the window in a curved shape, generally concave upward and outward, to reflect flect into a viewer's eyes substantially only light from the underside of the hood, if the viewer looks at the LCD from in front of the LCD; and solid-state digital electronic circuitry, electrically interconnected with the liquid-crystal display, for electronically storing directory information and for controlling the liquid-crystal display unit to automatically exhibit stored directory information in the form of a directory having multiple listings in an alphabetical or like order or in classified groupings.

26. The display unit of claim 25, wherein:
the glare-and-heat-loading reducing means further comprise a glare-reducing material applied on the liquid-crystal display.

27. The display unit of claim 26, wherein:
the curved shape of the window is substantially in the shape of a portion of a cylindrical surface; and
the hood extends outward from the front wall of the case beyond the center of curvature of the cylindrical-portion window.

28. The display unit of claim 26, wherein:
the window reflects substantially all received sunlight upward and outward to the hood.

29. The display unit of claim 26, wherein:
the window reflects light from a viewer's own image upward and outward to the hood, if the viewer looks at the LCD from in front of the LCD.

30. The display unit of claim 26, wherein:
the window reflects outward to a viewer only light from a portion of the hood that receives no reflected sunlight near midday, if the viewer looks at the LCD from in front of the LCD.

* * * * *